United States Patent [19] [11] 3,983,305
Peters et al. [45] Sept. 28, 1976

[54] METHOD OF INCREASING THE CORROSION RESISTANCE AND IMPROVING THE ORGANIC COATING CHARACTERISTICS OF COLD ROLLED STEEL AND THE PRODUCTS THUS PREPARED

[75] Inventors: Gordon L. Peters; William T. Saunders, both of Weirton, W. Va.

[73] Assignee: National Steel Corporation, Pittsburgh, Pa.

[22] Filed: Mar. 10, 1975

[21] Appl. No.: 557,171

Related U.S. Application Data

[63] Continuation-in-part of Ser. No. 398,308, Sept. 18, 1973, abandoned.

[52] U.S. Cl. .................... 428/467; 428/457; 148/6.35; 148/31.5; 427/46; 427/226; 427/334; 427/374; 427/384; 427/409; 427/417

[51] Int. Cl.[2] .................... C23F 7/04; B32B 15/04; B05D 3/02

[58] Field of Search ............. 427/334, 226, 46, 224, 427/409, 417, 374, 384, 388 R, 388 A, 388 B; 148/6.35, 31.5; 134/19; 428/467, 457

[56] References Cited

UNITED STATES PATENTS

| | | | |
|---|---|---|---|
| 1,362,213 | 12/1920 | Andrews | 148/6.35 |
| 2,288,980 | 10/1941 | Turin | 148/8 |
| 2,501,128 | 3/1950 | Kerr | 148/6.35 X |
| 2,833,672 | 5/1958 | Laubscher et al. | 427/46 X |
| 3,052,014 | 9/1962 | Falcon | 29/180 |
| 3,457,097 | 7/1969 | Yonezaki et al. | 427/320 X |
| 3,600,780 | 9/1971 | Dolce | 29/149.5 NM |

*Primary Examiner*—Ralph S. Kendall
*Attorney, Agent, or Firm*—Shanley, O'Neil and Baker

[57] ABSTRACT

The invention provides a novel method of increasing the corrosion resistance and improving the organic coating characteristics of cold rolled flat steel. In practicing the method, cold rolled flat steel in the as rolled condition having iron oxide and thermally degradable rolling oil on the surface thereof is heat treated at a tempterature sufficiently elevated to thermally degrade the rolling oil. The surface of the cold rolled steel has a relatively low corrosion resistance and relatively poor organic coating characteristics initially, and the heat treatment is continued until the corrosion resistance and the organic coating characteristics of the resulting heat treated steel are improved. Thereafter the heat treated steel is cooled to a temperature sufficiently low to prevent further thermal degradation of the rolling oil and produce a residual film on the heat treated steel surface which imparts corrosion resistance and improved organic coating characteristics. In a further variant of the invention, as rolled cold rolled flat steel of container stock gage is heat treated as described above, a hardenable fluid organic protective coating composition is applied to the resulting cooled heat treated steel, and thereafter the coating composition is hardened to produce container stock having a hardened coating of an organic protective coating thereon. The invention further provides the various products produced by the method of the invention.

26 Claims, No Drawings

METHOD OF INCREASING THE CORROSION RESISTANCE AND IMPROVING THE ORGANIC COATING CHARACTERISTICS OF COLD ROLLED STEEL AND THE PRODUCTS THUS PREPARED

RELATED APPLICATION

This is a continuation-in-part application of Ser. No. 398,308 filed Sept. 18, 1973, now abandoned.

BACKGROUND OF THE INVENTION

The present invention is concerned with a novel method of increasing the corrosion resistance and improving the organic protective coating characteristics of cold rolled flat steel. In one of its more specific variants, the invention is further concerned with a novel process for preparing container stock having a hardened coating of an organic protective coating thereon from cold rolled steel in the as rolled condition. The invention is also concerned with the various products produced by the method of the invention.

Cold reduced flat rolled mild steel products having thicknesses not greater than about 0.065 inch are usually produced by cold rolling hot rolled strip in coil form from a continuous hot strip mill. The sequence of operations involves uncoiling the hot rolled strip, passing the strip through a continuous pickler, rinsing, drying, oiling with a cold reduction lubricant which also protects against rusting, and recoiling. The resulting hot rolled strip is subsequently uncoiled and passed through a continuous cold reduction mill which has a plurality of stands with driven rolls. Modern continuous cold reduction mills operate at high strip speeds and often with heavy reductions in each stage and a large amount of heat is generated by frictional contact between the roll surfaces and the steel. The heat thus generated is removed by a system of flood lubrication in which streams or jets of an aqueous dispension of cold rolling oil are directed against the roll bodies and the surface of the steel. Following cold reduction to the desired gage, the cold rolled strip is coiled without removing the residual cold rolling oil and other surface contaminants such as iron oxide and dirt. Usually in container stock, the cold rolled strip is then uncoiled and cleaned to remove the residual rolling oil and surface contaminants. Thereafter the strip may be side trimmed and given any further treatments that are necessary or desirable for a given end use. Inasmuch as the freshly cold rolled and cleaned steel surface is very susceptible to rusting, often a protective coating is applied. The protective coating may be metallic in nature such as in the production of tin plate, or an organic protective coating may be applied such as in the production of lacquer or enamel coated blackplate.

The preparation of cold rolled flat steel having an organic protective coating thereon from cold rolled steel in the as rolled condition presents a number of problems. One serious problem is the above mentioned pronounced susceptibility to rusting while in transit to the customer and during storage awaiting use. Unless the as rolled steel is given a temporary protective coating, often rusting can not be controlled at an acceptable level while awaiting application of the final organic protective coating. The temporary protective coating increases the production cost substantially and usually adds very little, if anything, to the corrosion resistance of the final product. Thus, it would be possible to eliminate the temporary protective coating and reduce costs provided sufficient corrosion resistance to provide an adequate floor life could be imparted directly to the as rolled steel.

Another important disadvantage of the cold rolled steel lies in the organic coating characteristics of the initial as rolled surface. The residual cold rolling oil and perhaps other surface contaminants such as iron oxide and dirt cause the as rolled steel surface to have extremely poor organic coating characteristics. As a result, the as rolled steel surface can not be uniformly coated with a tightly adherent organic coating. The prior art has always taught that the organic coating characteristics can be improved only by carrying out a very efficient cleaning step. Usually the as rolled steel is passed through a strip cleaning line which employs a strong alkaline detergent solution to remove the rolling oil and other surface contaminants, and often the strip must be given an electrolytic treatment. The prior art has further taught that the cleaning step must be practiced prior to heating the cold reduced strip to a sufficiently elevated temperature such that the cold rolling lubricant would decompose, as the carbonaceous residue left on the strip surface was thought to be detrimental. The cleaning step adds substantially to the overall cost of processing the as rolled cold reduced strip and it would be desirable to eliminate this expense.

Prior to the present invention, an entirely satisfactory process was not available to the industry for overcoming the above mentioned difficulties with as rolled cold rolled steel to be given an organic protective coating. As a result, up until the present invention the art has followed the traditional practices of carrying out an expensive cleaning step to remove residual rolling oil and other surface contaminants and applying a temporary protective coating designed to increase floor life prior to applying the final organic protective coating.

It is an object of the present invention to provide a method of increasing the corrosion resistance of cold rolled flat steel in the as rolled condition.

It is a further object to provide a method of improving the protective organic coating characteristics of cold rolled flat steel in the as rolled condition which has iron oxide and a thermally degradable rolling oil on the surface thereof.

It is still a further object to provide a method of preparing container stock coated with a protective organic coating from cold rolled steel in the as rolled condition.

It is still a further object to provide cold rolled flat steel products prepared in accordance with the method of the invention.

Still other objects and advantages of the invention will be apparent to those skilled in the art upon reference to the following detailed description and the Examples.

DETAILED DESCRIPTION OF THE INVENTION INCLUDING PREFERRED VARIANTS THEREOF

In accordance with the invention, the corrosion resistance of cold rolled steel having iron oxide and thermally degradable rolling oil on the surface thereof is increased and the protective organic coating characteristics of the surface thereof are improved by heat treating the steel under controlled conditions of temperature and time. The steel is heat treated at a temperature sufficiently elevated to thermally degrade the rolling oil and the heat treatment is continued until the corrosion resistance and the organic protective coating characteristics of the resulting heat treated steel are improved. Thereafter, the heat treated steel is cooled to a temperature sufficiently low to prevent further thermal degradation of the rolling oil.

The surface of the resulting cooled heat treated steel has a residual film thereon containing iron oxide and thermally degraded rolling oil which imparts increased corrosion resistance and improved organic coating characteristics. If still additional corrosion resistance is desired, a coating of a hardenable fluid organic protective coating composition for container stocks may be applied and thereafter hardened or cured to produce a hardened organic protective coating on the surface of the cooled heat treated steel.

The cold rolled steel to be heat treated may be produced by prior art practices such as those disclosed in the text *The Making, Shaping and Treating of Steel*, Ninth edition, published by the The United States Steel Corporation, the teachings of which are incorporated herein by reference. Chapter 33 on the manufacture of cold reduced flat rolled steel products and Chapter 35 on the manufacture of coated container stocks such as tin plate are expecially pertinent. As is discussed therein, the resulting cold rolled steel strip is coiled in the as rolled condition without first removing the residual rolling oil or surface contaminants such as iron oxide, dirt and the like from the steel surface. Thereafter the cold rolled steel strip may be uncoiled, cleaned, trimmed, sheared, or given any other desired treatment. The cold rolled steel may be produced by a process including one or more cold rolling steps or stages, and in instances where a plurality of cold rolling steps or stages are used, with or without one or more intermediate annealing steps. The cold rolled steel may be produced, for example, by cold rolling directly to the desired thickness in a prior art tandem mill, or it may be produced by a prior art double reduction process wherein an initial tandem mill cold rolled product is annealed and then further reduced in thickness in a double reduction mill. It is understood that the cold rolled steel to be heat treated in accordance with the invention is in the "as rolled" condition following the last cold rolling step insofar as the residual rolling oil and the iron oxide surface contaminants on the strip surface are concerned, and the term as rolled is so used herein.

The surface of the as rolled steel has a relatively low corrosion resistance which is not normally considered to be sufficient for adequate floor life, and also relatively poor organic protective coating characteristics which normally prevent organic protective coatings from being applied directly thereto. The as rolled steel has not received a cleaning treatment for the purpose of removing residual rolling oil and iron oxide at the time of heat treating in accordance with the invention. The cold rolled steel usually has a thickness not greater than about 0.065 inch, and often about 0.025–0.065 inch when it is used for the manufacture of articles such as automotive bodies, furniture, household equipment and the like. In instances where the steel is used for the manufacture of containers, blackplate of gage 29 and lighter (0.0141 inch or less in thickness) is preferred. Cold rolled steel of a thickness suitable for the manufacture of containers is sometimes referred to herein as container stock, as this term is widely used and has a well recognized meaning in this art.

Cold rolled steel in the as rolled condition to be heat treated has at least one gram per base box of residual rolling oil thereon and varying amounts of iron oxide and other surface contaminants. For better results, the surface has about 2–50 grams per base box of residual rolling oil and preferably about 5–25 grams per base box. Optimum results are often achieved when the surface has about 10–15 grams per base box of residual rolling oil. Residual rolling oil in the foregoing quantities is normally present on as rolled steel strip produced in modern continuous multi-stand cold rolling mills. It is not necessary to wash or scrub residual rolling oil from the strip surface, or treat the strip surface for the purpose of removing iron oxide and other impurities and contaminants prior to the heat treatment and such cleaning steps should be avoided. The term "base box" is widely used in this art and refers to an amount of sheet steel having a surface area of 31,360 square inches or 217.78 square feet on one side.

The cold rolling oil should be thermally degradable at the temperature of the heat treatment. As a general rule, mineral oil based rolling oils are not preferred and especially the saturated mineral oils which do not thermally degrade readily. Nevertheless, good results may be achieved in most instances when the rolling oil contains a substantial percentage of mineral oil, such as up to 20% by volume and preferably up to 10% by volume. Cold rolling oils based upon animal oils or fats and vegetable oils are very satisfactory as they thermally degrade easily. Rolling oils of this type usually contain fatty acids and/or fatty acid mono-, di-, and tri-glycerides having about 14–22 carbon atoms and preferably about 16–18 carbon atoms. Varying amounts of unsaturation may be present and at least some unsaturation is preferred as often highly saturated of hydrogentated oils do not give as good results. Examples of animal oils and fats which may be used as cold rolling lubricants include tallow, lard, fish oils and the like. Examples of vegetable oils include corn oil, cotton seed oil, peanut oil, poppy seed oil, safflower seed oil, sunflower seed oil, soybean oil, rape seed oil, palm oil and the like. Mixtures of animal and vegetable fats and oils may be used when desired, and mineral oils also may be added thereto in the quantities stated. Additionally, synthetic ester rolling oils of the prior art may be used such as dioctyl sebacate, dioctyl phthalate, butyl stearate, butyl palmitate and the like. The synthetic ester rolling oils may be used alone, or used in admixtures with one or more of the aforementioned oils and fats. One type of fatty oil which has been found to produce very satisfactory results contains a preponderance of fatty acids and/or fatty acid glycerides having 16–18 carbon atoms in the acidic residua thereof, of which palmitic, stearic, oleic and linoleic acids are preferred. An oil of this type is palm oil, or an admixture of corn oil and cotton seed oil.

The temperature of the heat treatment and the period of heat treatment are critical insofar as the higher temperatures of treatment are concerned and must be maintained within the limits defined herein if entirely satisfactory results are to be achieved. As far as the lower temperatures of treatment are concerned, the as rolled steel must be heat treated at a temperature sufficiently elevated to thermally degrade the rolling oil over a period of time compatible with commercial treating line operating speeds. Usually the temperature of heat treatment is about 400°–800°F., and about 600°F. for best results. As a general rule, the period of the heat treatment should not exceed 10 seconds, and for better results should not be more than 5 seconds.

The best results are achieved when the heat treatment is not longer than 1 second. Usually there is no minimum period of heat treatment with the higher temperatures of treatment as the rolling oil thermally degrades upon heating to proper temperature to an extent sufficient for the purposes of the present invention. Thus, periods of heat treatment of 0.1–10, 0.1–5 and 0.0–1 seconds are satisfactory depending on the temperature of treatment. As a general rule, lower temperatures and shorter periods of heat treatment are preferred within the foregoing ranges and in such cases it is only necessary that the heat treatment be continued until the corrosion resistance and the organic coating characteristics of the resulting heat treated steel are improved. Thus whether the temperature of treatment is on the high side and the time short or the temperature of treatment is on the low side and time long, the time of treatment is until the corrosion resistance and the organic coating characteristics of the resulting heat treated steel are improved regardless of the extent and character of degradation of the oil.

The heat treated steel is quenched to a temperature sufficiently low to prevent further thermal degradation of the rolling oil. Prefarably, the heat treated steel is quenched immediately following the heat treatment for the above mentioned period of time to a temperature not greater than 200°F. and for best results to a temperature not greater than 100°F. The heat treated steel may be quenched in water, cool or cold air streams, or by other suitable means. Thereafter, the heat treating strip may be dried and coiled if quenched in water, or merely coiled if quenched in cool or cold air. If desired, an organic coating may be applied thereto before or following coiling as will be described hereinafter.

In a perferred variant, the as rolled steel is rapidly heated to the heat treating temperature, and then rapidly cooled to a temperature below the thermal degradation temperature. This procedure prevents warpage of the strip, and also discoloration of the coating that is formed on the strip. Additionally, adverse physical and metallurgical effects on the heat treated strip are prevented. Heat treatment at temperatures of 500°–700°F. for not more than 5 seconds, and preferably at about 600°F. for not more than 1 second, avoids the aforementioned problems.

The as rolled steel strip is preferably heat treated at high strip speeds employing high frequency induction heating. Strip speeds of 1,000, 2,000 or 3,000 feet per minute or higher may be used. The heat treatment may be performed along with other operations such as side trimming by placing a high frequency induction heater in the line at a convenient point. It is not necessary to wash the heat treated strip or perform any other operation thereon following the heat treatment with the exception of the quenching step. If desired, the heat treated steel may be oiled with a lubricant in the same manner as in the manufacture of tin plate following the flow brightening step. High frequency induction heating is the only practical way to heat the strip sufficiently fast to reach the proper temperature without inducing the adverse physical and metallurgical properties noted above in instances where strip speeds of 1,000 feet per minute or higher are employed. Infrared heating is not fast enough to raise the temperature of the strip to the proper heat treating level within the required period of time at high strip speeds. Infrared heating and other methods of heating may be employed when the period of time available therefor permits.

The residual film produced on the surface of the heat treated steel usually contains thermally degraded rolling oil in an amount of about 0.05–2 grams per base box, and preferably about 0.1–1 gram per base box. Better results are achieved when the residual film contains about 0.02–0.5 gram per base box of thermally degraded rolling oil, and best results at about 0.3 gram per base box.

The residual film of iron oxide and thermally degraded rolling oil markedly increases the corrosion resistance of the heat treated steel surface. Normally, the as rolled steel surface rusts very rapidly and the floor life is too short for practical operating conditions. The corrosion resistance of the heat treated steel product approaches that of one quarter pound electrolytic tin plate. This degree of corrosion resistance is remarkable in view of the fact that no additional substance is applied to the steel surface prior to heat treating.

The residual film is tightly adherent and forms an excellent base for organic protective coatings. It is compatible with the various types of organic protective coatings applied to container stocks in general, and to tin plate or blackplate in particular. The prior art organic coatings may be applied directly to the cooled heat treated steel surface, immediately after quenching, and prior to coiling, or in a separate coating step at any time following coiling. The organic protective coatings may be applied by prior art techniques such as by spraying, brushing, roller coating and electrostatic deposition. High speed organic protective coating lines of the type employed in the manufacture of coated container stock may be employed. The heat treated steel may be in the form of sheet or strip at the time of applying the organic protective coating.

In practicing the organic coating method of the invention any suitable prior art fluid organic protective coating material that is subsequently hardenable or curable may be used, including varnishes, lacquers and enamels for metallic container stocks. Specific examples of organic coating materials include epoxy, modified epoxy, phenolic, modified phenolic, acrylic, modified acrylic, vinyl, modified vinyl, alkyd and polyurethane varnishes, lacquers and/or enamels. Piror art lithographing or printing inks which are suitable for use on metallic container stocks for labeling and decorative purposes are considered to be organic coatings for the purpose of the present invention. The organic coating materials should be fluid initially, i.e., sufficiently fluid to be applied by metering rolls, spraying, brushing, and direct or indirect printing or lithographing, and may vary from soft pastes to fluid liquids depending upon the selected method of application. The initially fluid organic coating material is hardened or cured following application by, for example, evaporating solvent or baking to produce the final organic coating. The method of applying the initially fluid organic coating material and then hardening the same to produce the fianl organic coating may be in accordance with prior art practice.

The foregoing detailed description and the following specific examples are for purposes of illustration only, and are not intended as being limiting to the spirit or scope of the appended claims.

EXAMPLE I

This Example illustrates the improved corrosion resistance that is obtained upon heat treating as rolled blackplate in accordance with the invention.

Two coils of blackplate in the as rolled condition are produced in a prior art four stand condinuous cold reduction line employing a 50—50 mixture of corn oil and cotton seed oil as a rolling lubricant in the form of an aqueous emulsion. The two coils are produced under identical operating conditions and have 10 grams per base box of residual rolling oil on the steel surfaces. The steel surfaces also have varying amounts of iron oxide, dirt and other contaminants in the usual quantities. No rolling oil or other contaminants are removed.

One coil of the as rolled blackplate is reserved for use as a control. The other coil of blackplate is passed through a side trimmer line at a strip speed of about 2,000 feet per minute and is heat treated by induction heating at a temperature of 600°F. for a period of 1 second. The heat treated blackplate is quenched immediately with water to a temperature below 100°F., dried, and coiled.

The heat treated coil of blackplate and the as rolled coil of blackplate are stored for 12 months in a warehouse under identical conditions. At the end of the 12 months test period, the coil of as rolled blackplate has sufficient rusting to adversely affect the quality of a coated product prepared therefrom. The heat treated coil of blackplate is substantially free of rust and is entirely satisfactory for coating with an organic protective coating without further cleaning or pretreatment. Thus, the heat treatment of the present invention greatly extends the floor life of cold reduced steel.

EXAMPLE II

This Example illustrates the improvement in the organic coating characteristics of as rolled blackplate following heat treatment in accordance with the invention.

Two additional coils of as rolled blackplate are prepared in accordance with Example I. The first coil is not heat treated and is reserved as a control. The second coil is given a heat treatment in accordance with the general procedure of Example I.

The heat treated coil is passed through a high speed line for lacquering and lithographing container stock. The organic coating is an epoxy lacquer which exhibits a tendency toward poor wetting, eyeholing and poor adherence.

No problems are experienced with respect to eyeholing or nonuniform wetting of the heat treated blackplate. The coating is tightly adherent and an entirely satisfactory epoxy lacquer coated blackplate is produced.

Entirely unsatisfactory results are obtained when an effort is made to pass the as rolled blackplate coil through the lacquering and lithographing line. The hardened film of epoxy lacquer is not adherent and eyeholing is present. Thus, the as rolled blackplate can not be satisfactorily lacquered and lithographed in the absence of the heat treatment of the invention.

We claim:

1. A method of increasing the corrosion resistance of cold rolled flat steel and improving the organic coating characteristics of the surface thereof comprising heat treating as rolled cold rolled flat steel having iron oxide and thermally degradable rolling oil on the surface thereof at a temperature of 400°–800°F. to thermally degrade the rolling oil, the surface of the cold rolled flat steel having relatively low corrosion resistance and relatively poor organic coating characteristics initially and the heat treatment being continued for not more than 10 seconds until the corrosion resistance and the organic coating characteristics of the resulting heat treated steel are improved, and immediately cooling the said heat treated steel to a temperature not greater thaan 200°F. to prevent further thermal degradation of the rolling oil, the surface of the resulting cooled heat treated steel having a residual film thereon containing iron oxide and thermally degraded rolling oil which imparts corrosion resistance and improved organic coating characteristics thereto.

2. The heat treated cold rolled flat steel prepared by the method of claim 1.

3. The method of claim 1 wherein the cold rolled flat steel is heat treated by induction heating.

4. The method of claim 1 wherein at least one gram per base box of thermally degradable rolling oil is on the cold rolled steel surface to be heat treated.

5. The heat treated cold rolled flat steel prepared by the method of claim 4.

6. The method of claim 1 wherein the said residual film on the heat treated steel surface contains at least 0.05 gram per base box of thermally degraded rolling oil.

7. The heat treated cold rolled flat steel prepared by the method of claim 6.

8. The method of claim 1 wherein the cold rolled flat steel is heat treated at a temperature of 500°–700°F. for a period of not more than 5 seconds.

9. The heat treated cold rolled flat steel prepared by the method of claim 8.

10. The method of claim 1 wherein about 2–25 grams per base box of rolling oil is on the cold rolled steel surface to be heat treated and the said residual film on the heat treated steel surface contains about 0.1–1 gram per base box of thermally degraded rolling oil.

11. The heat treated cold rolled flat steel prepared by the method of claim 10.

12. The method of claim 1 wherein about 10–15 grams per base box of rolling oil is on the cold rolled steel surface to be heat treated, the steel is heat treated at a temperature of about 500°–700°F. for not more than 5 seconds, the said heat treated steel is cooled to a temperature less than 200°F. following the heat treatment and the said residual film on the heat treated steel surface contains about 0.2–0.5 gram per base box of thermally degraded rolling oil.

13. The heat treated cold rolled flat steel prepared by the method of claim 12.

14. The method of claim 1 wherein about 10 grams per base box of rolling oil is on the cold rolled steel surface to be heat treated, the steel is heat treated by induction heating at a temperature of about 600°F. for not more than one second, the said heat treated steel is cooled to a temperature less than 100°F. immediately following the heat treatment, and the said residual film on the heat treated steel surface contains about 0.3 gram per base box of thermally degraded rolling oil.

15. The heat treated cold rolled flat steel prepared by the method of claim 14.

16. A method of preparing container stock coated with an organic protective coating comprising heat treating as rolled cold rolled steel of container stock gage having iron oxide and thermally degradable rolling oil on the surface thereof at a temperature of 400°–800°F. to thermally degrade the rolling oil, the surface of the cold rolled steel having relatively low corrosion resistance and relatively poor organic coating characteristics initially and the heat treatment being continued for not more than 10 seconds until the corrosion resistance and the organic coating characteristics of the resulting heat treated steel are improved.

immediately cooling the said heat treated steel to a temperature not greater than 200°F. to prevent further thermal degradation of the rolling oil, the surface of the resulting cooled heat treated steel having a residual film thereon containing iron oxide and thermally degraded rolling oil which imparts corrosion resistance and improved organic coating characteristics thereto, applying a coating of a hardenable fluid organic protective coating composition for container stock on the surface of the cooled heat treated steel, and thereafter hardening the said fluid organic coating composition to produce container stock having a hardened organic protective coating thereon.

17. The container stock coated with an organic protective coating prepared by the method of claim 16.

18. The method of claim 16 wherein the cold rolled steel is heat treated by induction heating.

19. The method of claim 16 wherein at least one gram per base box of thermally degradable rolling oil is on the cold rolled steel surface to be heat treated and the said residual film on the heat treated steel surface contains at least 0.05 gram per base box of thermally degraded rolling oil.

20. The container stock coated with an organic protective coating prepared by the method of claim 19.

21. The method of claim 16 wherein about 2–25 grams per base box of rolling oil is on the cold rolled steel surface to be heat treated, the cold rolled steel is heat treated at a temperature of about 500°–700°F. for a period of not more than 5 seconds, and the said residual film on the heat treated steel surface contains about 0.1–1 gram per base box of thermally degraded rolling oil.

22. The container stock coated with an organic protective coating prepared by the method of claim 21.

23. The method of claim 16 wherein about 10–15 grams per base box of rolling oil is on the cold rolled steel surface to be heat treated, the steel is heat treated at a temperature of about 500°–700°F. for not more than 5 seconds, the said heat treated steel is cooled to a temperature less than 200°F. following the heat treatment, and the said residual film on the heat treated steel surface contains about 0.2–0.5 gram per base box of thermally degraded rolling oil.

24. The container stock coated with an organic protective coating prepared by the method of claim 23.

25. The method of claim 16 wherein about 10 grams per base box of rolling oil is on the cold rolled steel surface to be heat treated, the steel is heat treated by induction heating at a temperature of about 600°F. for not more than one second, the said heat treated steel is cooled to a temperature less than 100°F. immediately following the heat treatment, and the said residual film on the heat treated steel surface contains about 0.3 gram per base box of thermally degraded rolling oil.

26. The container stock coated with an organic protective coating prepared by the method of claim 25.

* * * * *

UNITED STATES PATENT OFFICE
CERTIFICATE OF CORRECTION

Patent No. 3,983,305 Dated September 28, 1976

Inventor(s) GORDON L. PETERS and WILLIAM T. SAUNDERS

It is certified that error appears in the above-identified patent and that said Letters Patent are hereby corrected as shown below:

Col. 6, line 6, "0.02-0.5" should be -- 0.2-0.5 --.

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*